(12) United States Patent
Otoguro

(10) Patent No.: US 7,782,511 B2
(45) Date of Patent: Aug. 24, 2010

(54) OPTICAL SCANNING APPARATUS AND IMAGE FORMING APPARATUS COMPRISING THE SAME

(75) Inventor: Yasuaki Otoguro, Abiko (JP)

(73) Assignee: Canon Kabushiki Kaisha (JP)

( * ) Notice: Subject to any disclaimer, the term of this patent is extended or adjusted under 35 U.S.C. 154(b) by 258 days.

(21) Appl. No.: 11/959,954

(22) Filed: Dec. 19, 2007

(65) Prior Publication Data
US 2008/0158634 A1 Jul. 3, 2008

(30) Foreign Application Priority Data
Dec. 28, 2006 (JP) ............................. 2006-355160
Dec. 14, 2007 (JP) ............................. 2007-324019

(51) Int. Cl.
G02B 26/08 (2006.01)
(52) U.S. Cl. .................................................. 359/196.1
(58) Field of Classification Search ... 359/196.1–226.2, 359/322–323; 347/234, 243, 248, 259–260
See application file for complete search history.

(56) References Cited

U.S. PATENT DOCUMENTS

| 5,218,377 A * | 6/1993 | Kataoka et al. | ............. 347/246 |
| 2002/0195552 A1 * | 12/2002 | Ueda | .......................... 250/234 |

FOREIGN PATENT DOCUMENTS

| JP | 60-120316 A | 6/1985 |
| JP | 62-143554 A | 6/1987 |
| JP | 4-106515 A | 4/1992 |
| JP | 4-240814 A | 8/1992 |
| JP | 5-38844 A | 2/1993 |
| JP | 6-175053 A | 6/1994 |
| JP | 2003-279873 A | 10/2003 |
| JP | 2005-181694 A | 7/2005 |

OTHER PUBLICATIONS

"Crystal Growth Technology of Potassium Tantalate Niobate," Mar. 31, 2006, Nippon Telegraph and Telephone Corporation Photonics Laboratory, Annual Research Activities Reports 2005: Optical Signal Processing V.*

* cited by examiner

Primary Examiner—Euncha P Cherry
(74) Attorney, Agent, or Firm—Rossi, Kimms & McDowell LLP

(57) ABSTRACT

An optical scanning apparatus includes a laser diode, electro-optical crystal member, BD sensor, two light detection sensors and voltage control unit. The electro-optical crystal member is arranged in the optical path between the laser diode and a polygon mirror, and deflects the light beam in the sub-scanning direction by applied voltage. The BD sensor and two light detection sensors detect the light beam deflected in the sub-scanning direction. A scanning control unit controls, based on the detection results obtained by the BD sensor and two light detection sensors, the irradiation position of the light beam on a photosensitive drum. The BD sensor and two light detection sensors are arranged at positions distant in the sub-scanning direction from an optical path to the photosensitive drum and at the central portion and two end portions of an image forming region in the main scanning direction.

14 Claims, 11 Drawing Sheets

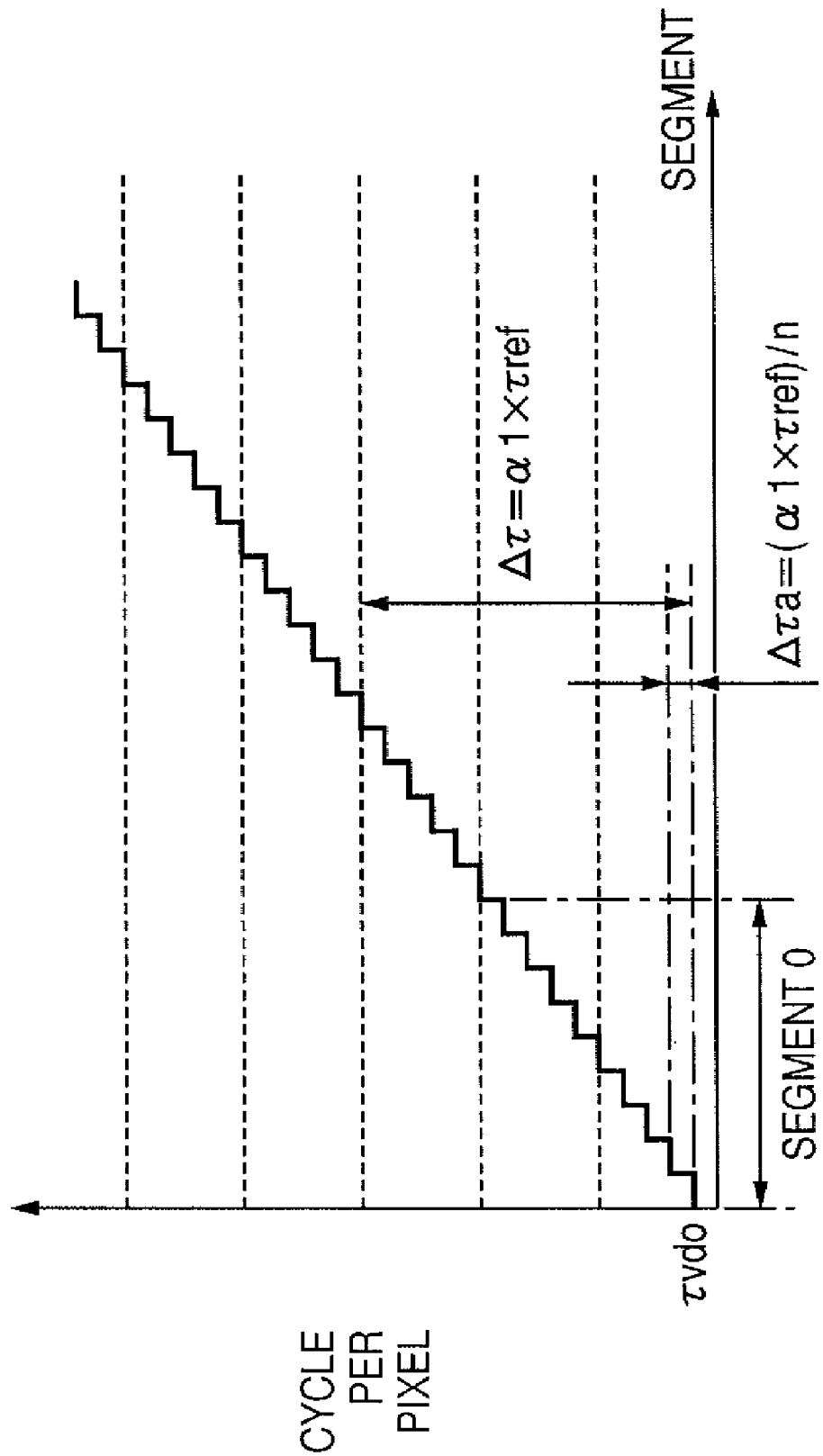

OPTICAL SCANNING APPARATUS AND IMAGE FORMING APPARATUS COMPRISING THE SAME

BACKGROUND OF THE INVENTION

1. Field of the Invention

The present invention relates to an optical scanning apparatus mounted in an image forming apparatus using an electrophotographic process technique, and an image forming apparatus comprising the optical scanning apparatus.

2. Description of the Related Art

Conventionally, an electrophotographic image forming apparatus generally causes a rotary polyhedral mirror (polygon mirror) rotated by a scanner motor to deflect a laser beam emitted by driving a semiconductor laser in accordance with input image data, thereby irradiating and scanning on a photosensitive member with the deflected laser beam. With this operation, the image forming apparatus forms a latent image, develops the latent image into a toner image, and transfers the toner image onto a recording medium, thereby forming a final image.

An image forming apparatus of this type includes optical components such as a reflection mirror and f-θ lens inserted between the polygon mirror and the photosensitive member. The f-θ lens has optical characteristics such as condensing a laser beam and compensating distortion aberration so as to guarantee temporal scanning linearity. With these characteristics, laser beams having passed through the f-θ lens are condensed and scanned on the photosensitive member in a predetermined direction at a constant speed.

However, the f-θ lens has characteristics deviating from the design values due to, for example, manufacturing variations. Therefore, color misalignment and color unevenness occur due to a registration error in write position or a magnification error, depending on the position in the main scanning direction (the longitudinal direction of the photosensitive member) of a laser beam irradiated on the photosensitive member.

That is, a laser beam passes through the f-θ lens inserted between the polygon mirror and the photosensitive member, for one main scanning interval during which one line is scanned by irradiating the laser beam on the polygon mirror mounted on a scanner motor and rotationally driven as the scanner motor rotates. Therefore, the laser beam is irradiated at a position on the photosensitive member, which has an error from an ideal image forming position due to the deviation of the characteristics of the f-θ lens. A shift from an ideal image forming position also occurs due to, for example, deterioration in the refractive index distribution or profile irregularity of an optical component upon, for example, an environmental fluctuation in the image forming apparatus.

There are proposed techniques of detecting and reducing the error from the ideal image forming position.

For example, Japanese Patent Laid-Open No. 2005-181694 proposes an arrangement which includes a mirror for reflecting and guiding a laser beam having passed through the f-θ lens to the photosensitive member, and light detectors which are arranged outside the two ends of the mirror and used to detect a sync signal serving as a write reference for a laser beam in the main scanning direction, that is, the longitudinal direction of the photosensitive member. Based on the detection signals from the light detectors, an error from an ideal time is calculated/corrected.

Japanese Patent Laid-Open No. 62-143554 proposes an arrangement which includes a beam splitter for splitting a laser beam having passed through the scanning lens into a transmitted beam component and a reflected beam component, and a detection unit for detecting scanning position arranged downstream of the beam splitter. The reflected beam component generated by the beam splitter forms an image on the surface of the photosensitive member, and the transmitted beam component is guided to the detection unit.

The arrangement which includes the light detectors arranged outside the two ends of the mirror, as disclosed in Japanese Patent Laid-Open No. 2005-181694, can detect and correct the overall error in magnification in the main scanning direction. Assume, however, that the amount of error from an ideal length from a start position of main scanning to a center position of main scanning or that from the center position to an end position of main scanning changes upon, for example, a temperature rise in a part of the lens. In this case, the error cannot be exactly detected and corrected by the technique in the above publication.

The arrangement which causes the transmitted beam component form an image on the surface of the photosensitive member and guides the reflected beam component to each detection unit, as disclosed in the above-described Japanese Patent Laid-Open No. 62-143554, can detect the scanning timing in a main scanning region. However, since the beam splitter splits the laser beam into a transmitted beam component and a reflected beam component, this detection is largely influenced by the profile irregularity of the beam splitter and the mirror vibration even when the amount of error is corrected. This makes it impossible to exactly correct the image forming position. Still worse, neither reflected light beam to scan the photosensitive member nor transmitted beam component to detect the amount of error can be ensured in sufficient amounts because the amount of light decreases by half upon beam splitting. This leads to deterioration in the detection accuracy.

SUMMARY OF THE INVENTION

It is an object of the present invention to provide an optical scanning apparatus which can exactly correct the image forming position while improving the detection accuracy of a light beam, and an image forming apparatus comprising the optical scanning apparatus.

An aspect of the present invention provides an optical scanning apparatus comprising: a light source adapted to emit a light beam; a light deflection unit adapted to deflect the light beam emitted from the light source to scan the light beam on a photosensitive member in a main scanning direction; an electro-optical crystal member, which is inserted in an optical path between the light source and a plurality of light detection units, adapted to deflect the light beam emitted from the light source in a sub-scanning direction by a voltage applied the electro-optical crystal member; and the plurality of light detection units adapted to detect the light beam deflected in the sub-scanning direction by the electro-optical crystal member, wherein the plurality of light detection units are arranged within an image forming region, in the main scanning direction, corresponding to the electrostatic latent image formed on the photosensitive member, and outputs of the plurality of light detection units are used to control an irradiation position of the light beam on the photosensitive member in the main scanning direction.

The electro-optical crystal member is inserted in an optical path between the light source and the light deflection unit. The plurality of light detection unit comprise three light detection units, which are respectively arranged at positions distant in the sub-scanning direction from an optical path of the light beam to the photosensitive member and at a central portion and two end portions in the main scanning direction within the image forming region. The three light detection units detect timings at which the light beam deflected in the sub-scanning direction by the electro-optical crystal member and deflected and scanning in the main scanning direction by the light deflection unit respectively passes through the three light detection units. The electro-optical crystal member is made of an electro-optical crystal having a characteristic that a refractive index of the electro-optical crystal changes upon an applied voltage, and the optical scanning apparatus further comprises a voltage control unit adapted to control the applied voltage applied to the electro-optical crystal. The voltage control unit comprises a pair of electrode mounted on surfaces of the electro-optical crystal, and a voltage applied to the pair of electrode forms an electric field in the electro-optical crystal at a right angle with respect to a traveling path of the light beam passing through the electro-optical crystal. The electro-optical crystal essentially consists of potassium, tantalum, niobium and oxygen. When an image forming apparatus processes images in a unit of a plurality of images, the electro-optical crystal member deflects the light beam emitted from the light source, in the sub-scanning direction, within a period from an end of formation of an electrostatic latent image corresponding to the unit of images to a start of formation of an electrostatic latent image corresponding to the next unit of images. The optical scanning apparatus further comprises a light beam driving control unit adapted to control a driving of the light beam emitted from the light source in accordance with a pulse to control ON/OFF time of the light beam.

Another aspect of the present invention provides an image forming apparatus comprising an optical scanning apparatus, the optical scanning apparatus comprising: a light source adapted to emit a light beam; a light deflection unit adapted to deflect the light beam emitted from the light source to scan the light beam on a photosensitive member in a main scanning direction; an electro-optical crystal member, which is inserted in an optical path between the light source and a plurality of light detection units, adapted to deflect the light beam emitted from the light source in a sub-scanning direction by a voltage applied the electro-optical crystal member; and the plurality of light detection units adapted to detect the light beam deflected in the sub-scanning direction by the electro-optical crystal member, wherein the plurality of light detection units are arranged within an image forming region, in the main scanning direction, corresponding to the electrostatic latent image formed on the photosensitive member, and outputs of the plurality of light detection units are used to control an irradiation position of the light beam on the photosensitive member in the main scanning direction. The image forming apparatus further comprises a photosensitive member on which an electrostatic latent image is formed at an irradiation position by the deflected light beam scanning on the photosensitive member.

According to the present invention, an electro-optical crystal member is inserted in the optical path between a light source and a light deflection unit, and a light beam emitted by the light source is deflected in the sub-scanning direction by an applied voltage. A plurality of light detection units are provided in a main scanning region corresponding to an electrostatic latent image formed on a photosensitive member. A control unit controls the irradiation position of the light beam on the photosensitive member in the main scanning direction based on the detection results obtained by the plurality of light detection units. This makes it possible to accurately detect the light beam without any influence of a loss of the amount of light and to exactly correct an error in dot position in the main scanning region. It is therefore possible to exactly correct the image forming position while improving the detection accuracy.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5A is a chart showing the relationship between each segment and the cycle of an image clock in the segment when the initial segment is variable and an image clock in one segment is changed in a multi-step manner;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Arrangement Example of Image Forming Apparatus Comprising Optical Scanning Apparatus>

Figure 1A:
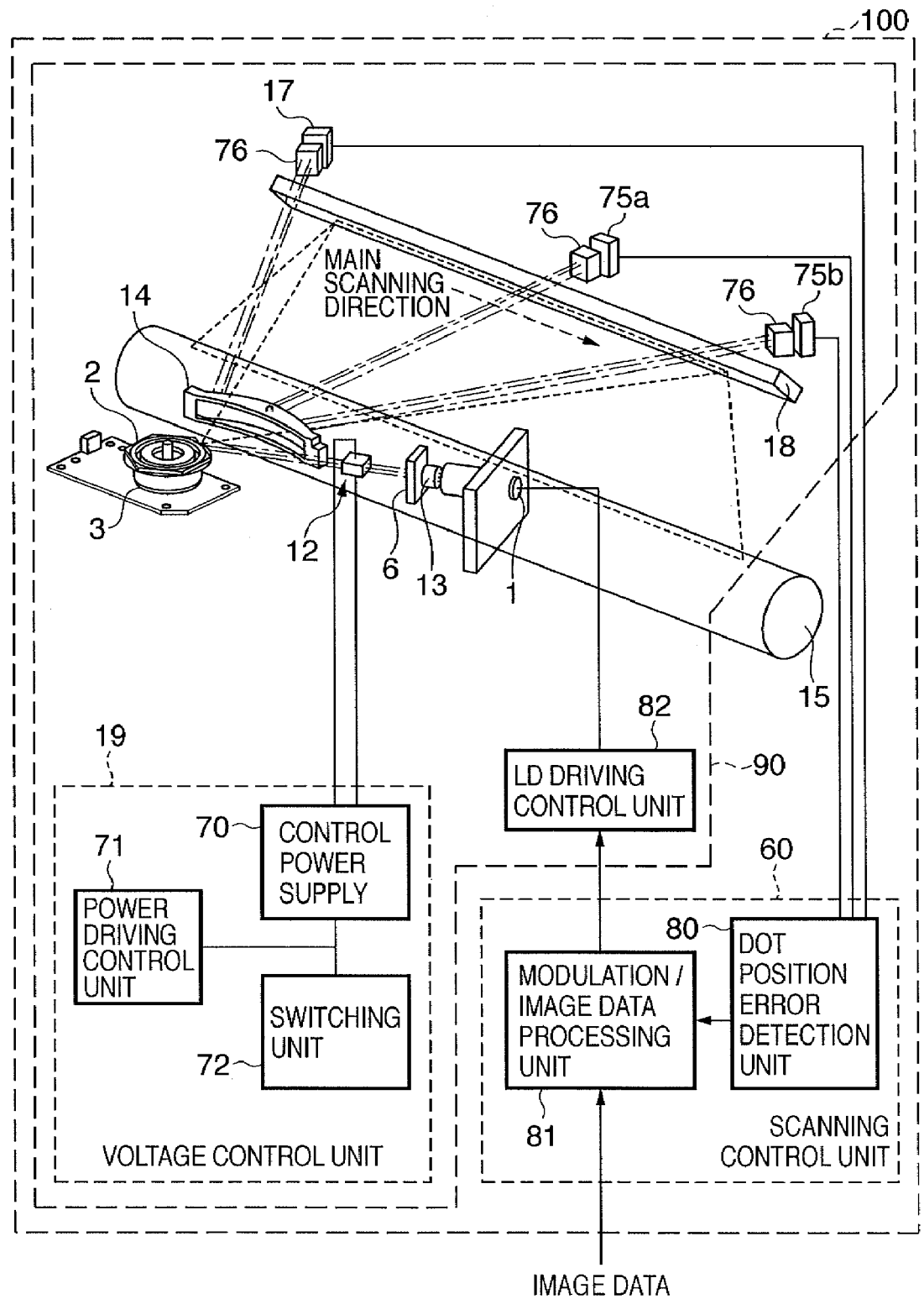
FIG. 1A is a perspective view schematically showing the arrangement of an image forming apparatus which mounts an optical scanning apparatus according to an embodiment of the present invention.
Figure 1B:
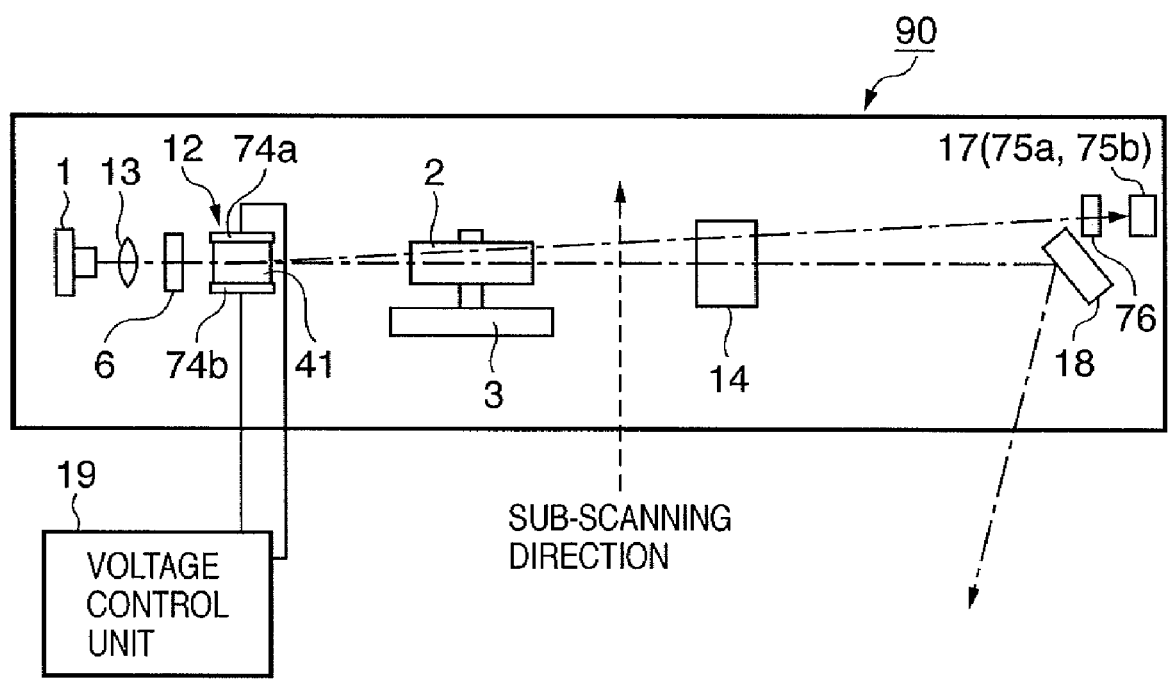
FIG. 1B is a sectional view schematically showing the arrangement of the image forming apparatus which mounts the optical scanning apparatus according to the embodiment of the present invention.

FIGS. 1A and 1B are views schematically showing the arrangement of an image forming apparatus which mounts an optical scanning apparatus according to an embodiment of the present invention. FIG. 1A is a perspective view, and FIG. 1B is a sectional view.

Referring to FIGS. 1A and 1B, an image forming apparatus 100 comprises an optical scanning apparatus 90 which applies a laser beam to a photosensitive drum 15 (to be described later) so as to form an electrostatic latent image corresponding to input image data on it.

<First Arrangement Example of Optical Scanning Apparatus>

The optical scanning apparatus 90 comprises a laser driving control unit 82, a laser diode (light source) 1, a collimator lens 13, a cylindrical lens 6, a polygon mirror 2, a reflecting member 18, an electro-optical crystal member 12, a beam detection sensor (to be abbreviated as a BD sensor hereinafter) 17, light detection sensors 75a and 75b, and an f-θ lens 14. The laser diode 1 emits a diffused laser beam in accordance with a signal from the laser driving control unit 82. The collimator lens 13 converts the diffused laser beam emitted by the laser diode 1 into a substantially parallel light beam. The cylindrical lens 6 deflects the light beam converted by the collimator lens 13 in the sub-scanning direction, and guides the deflected light beam to an electro-optical crystal member 12 (to be described later). The polygon mirror 2 scans the light beam in the main scanning direction. The reflecting member 18 reflects the light beam scanned by the polygon mirror 2 towards the photosensitive drum 15. On the photosensitive drum 15, an electrostatic latent image is formed at the irradiation position of the light beam reflected by the reflecting member 18.

The electro-optical crystal member 12 is inserted into the optical path between the cylindrical lens 6 and the polygon mirror 2, and deflects the light beam emitted by the laser diode 1, in the sub-scanning direction (a direction perpendicular to the traveling direction of the light beam which passes through the electro-optical crystal member 12, that is, the sub-scanning direction in FIG. 1B) by an applied voltage. The BD sensor 17 and light detection sensors 75a and 75b are arranged at a distant from the reflecting member 18 in the sub-scanning direction, for example, at upper positions from the reflecting member 18, to detect the light beam deflected in the sub-scanning direction by the electro-optical crystal member 12. The f-θ lens 14 causes the light beam scanned by the polygon mirror 2, focus as an image on the photosensitive drum 15 via the reflecting member 18. Condenser lenses 76 for condensing the light beam at the surfaces of the BD sensor 17 and light detection sensors 75a and 75b are arranged upstream of their optical paths.

The optical scanning apparatus 90 also comprises a voltage control unit 19 and a LD (Laser Diode) driving control unit 82. The voltage control unit 19 electrically connects to the electro-optical crystal member 12, and controls a voltage applied to the electro-optical crystal member 12. The LD driving control unit controls ON/OFF of the laser diode 1 based on an output signal from a scanning control unit 60, which controls the irradiation position on the photosensitive drum 15, of the light beam emitted by the laser diode 1, based on the detection results obtained by the BD sensor 17 and light detection sensors 75a and 75b.

The BD sensor 17 also detects a horizontal synchronous signal (BD signal) serving as a reference for writing an image on the photosensitive drum 15 in the main scanning direction.

(Arrangement Example of Electro-Optical Crystal Member 12)

Figure 2:
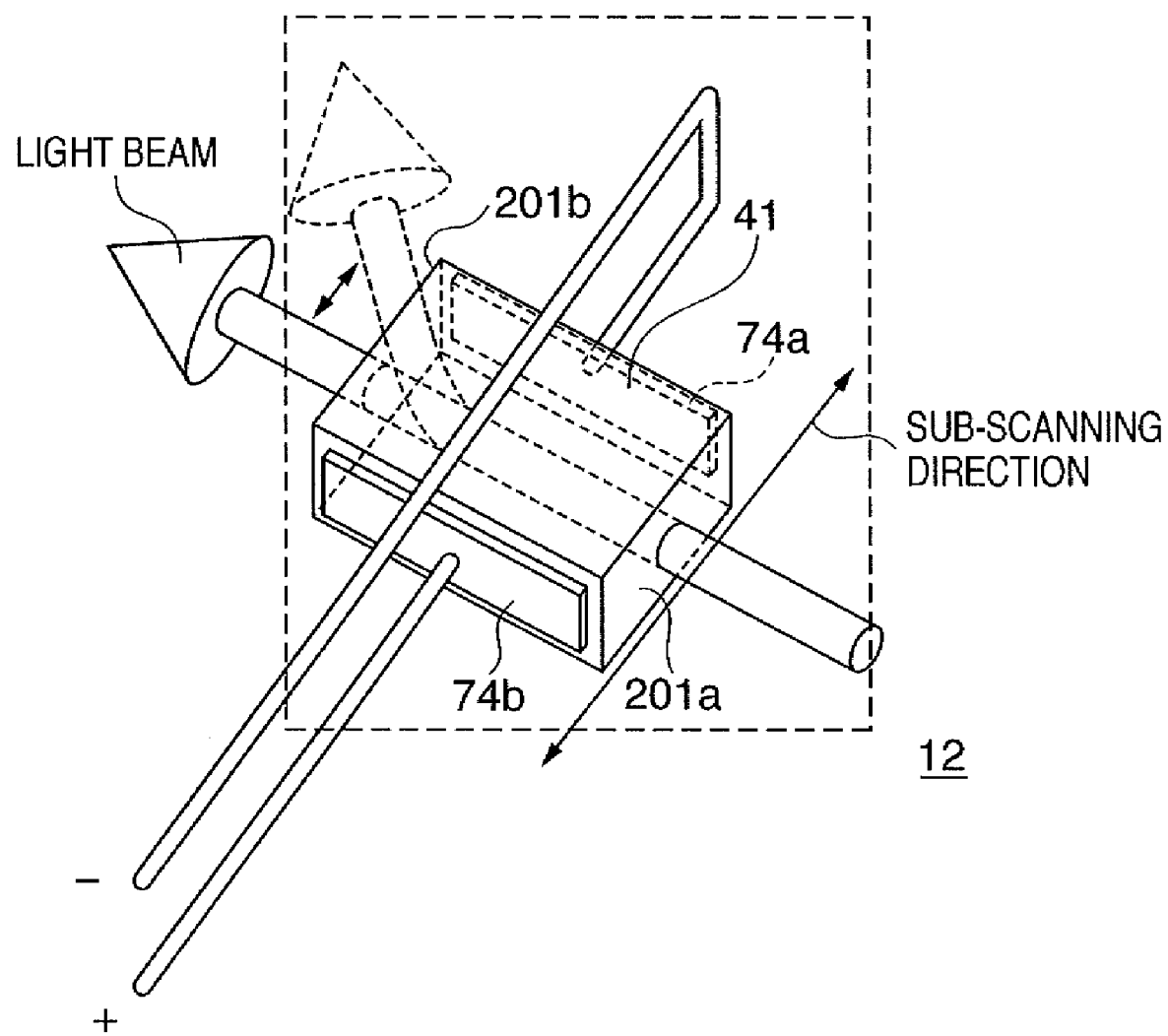
FIG. 2 is a perspective view schematically showing an arrangement of an electro-optical crystal member 12 shown in FIGS. 1A and 1B.

FIG. 2 is a perspective view schematically showing the arrangement of the electro-optical crystal member 12 shown in FIGS. 1A and 1B.

As shown in FIG. 2, the electro-optical crystal member 12 comprises a rectangular parallelepiped electro-optical crystal (to be referred to as an "EO crystal" hereinafter) 41 having an incident surface 201a and an exiting surface 201b of a light beam. The electro-optical crystal member 12 also comprises a pair of electrodes 74a and 74b mounted on the two end faces of the EO crystal 41, which extend at a right angle with respect to the sub-scanning direction, and a power supply (not shown) for applying a voltage between the pair of electrodes 74a and 74b.

The electrodes 74a and 74b each have a linear stripe shape with a relatively short electrode width "d" and a length "L." The electrodes 74a and 74b are made of a material such as Au, but may be made of another conductive material. The electrodes 74a and 74b are manufactured by vacuum vapor deposition.

The voltage applied between the pair of electrodes 74a and 74b forms an electric field in the EO crystal 41 in a direction (the up and down direction in FIG. 1B and the sub-scanning direction in FIG. 2) perpendicular to the traveling path of the light beam passing through the EO crystal 41.

While no voltage is applied to the electrodes 74a and 74b, the EO crystal 41 does not exhibit the lens function and directly guides an incident light beam income from the incident surface 201a to a polygon mirror 5 via the exiting surface 201b without deflecting the incident light beam.

A voltage of 2 to 5 kV at maximum is applied to the pair of electrodes 74a and 74b to generate an electric field in the EO crystal 41, thereby generating an electric field distribution. Thus, the light beam is deflected in the sub-scanning direction by several degrees of angle, for example, 3° within a time of several ms to ns. While no image is formed, the electro-optical crystal member 12 deflects the light beam in the sub-scanning direction and guides it to the BD sensor 17 and light detection sensors 75a and 75b via the polygon mirror 5 using an electro-optical effect at high speed and wide angle. The above-described deflection angle by the electro-optical crystal member 12 is suitably changed to an appropriate value in accordance with the positions at which the BD sensor 17 and light detection sensors 75a and 75b are arranged.

The electro-optical crystal here means a crystal having a characteristic such that its refractive index changes upon an applied voltage. The EO crystal 41 is an electro-optical crystal such as a KTN ($KTa_{1-x}Nb_xO_3$, typically $KTaNbO_3$: Kalium Tantalate Niobate) crystal having as components potassium, tantalum, niobium and oxygen. The KTN crystal can be handled like normal optical glass, and has excellent processibility so as to easily ensure surface precision in cutting and polishing. The KTN crystal has the internal light transmittance of 95% or more per meter in the laser wavelength range of infrared light to visible light. The KTN crystal has a low birefringence. The water absorbance of the KTN crystal is less than that of normal glass and extremely low with respect to resins.

As is well known, the internal refractive index of the KTN crystal changes upon application of an electric field to it. When electrodes (voltage at one electrode=V, and voltage at the other electrode=0) are attached to the two ends of the KTN crystal to generate an internal electric field, the internal electric field has a gradient profile, and hence the refractive index has a gradient index profile. Light beam travels while changing the traveling direction. The KTN crystal is characterized by high-speed and wide-angle operation.

In accordance with an increase in voltage applied to the two end portions of the EO crystal 41, the direction of a light beam passing through the EO crystal 41 is greatly deflected in the electric field direction.

According to the present invention, using this phenomenon changes the traveling direction during laser beam transmission through the KTN crystal.

(Arrangement Example of Voltage Control Unit)

The voltage control unit 19 comprises a control power supply 70, a power driving control unit 71 for controlling to drive the control power supply 70, and a switching unit 72 for switching a voltage applied to the electro-optical crystal member 12. The voltage control unit 19 has a structure adapted to selectively apply a voltage to the electro-optical crystal member 12.

(Arrangement Example of Each Sensor)

The BSD sensor 17 and light detection sensors 75a and 75b are arranged at the initial irradiation position (dot position), central irradiation position, and final irradiation position of a light beam scanning on the photosensitive drum 15, that is, the central portion and two end portions of an image forming region corresponding to an electrostatic latent image formed on the photosensitive drum 15. The BD sensor 17 and light detection sensors 75a and 75b are arranged at equal intervals in the main scanning direction, that is, the longitudinal direction (axial direction) of the photosensitive drum 15 such that the light detection sensor 75a is set at the center. This makes it possible to suppress deterioration in detection accuracy caused by the influence of, for example, the aberration of the f-θ lens 14.

(Arrangement Example of Scanning Control Unit)

The scanning control unit 60 comprises a dot position error detection unit 80 and a modulation/image data processing unit 81. The dot position error detection unit 80 detects errors in dot positions at the central portion and two end portions of an image forming region based on the detection signals from the BD sensor 17 and light detection sensors 75a and 75b. The modulation/image data processing unit 81 performs image data processing and generates a signal for the light emission timing of the laser diode 1 so as to correct the errors in dot positions detected by the dot position error detection unit 80. The modulation/image data processing unit 81 outputs the generated signal to the LD driving control unit 82 which controls the light emission timing of the laser diode 1.

<Operation Example of Optical Scanning Apparatus>

A laser beam emitted by the laser diode 1 is converted into a substantially parallel light beam via the collimator lens 13. After that, the light beam is condensed in the sub-scanning direction by passing it through the cylindrical lens 6. The light beam having passed through the cylindrical lens 6 is transmitted through the electro-optical crystal member 12, and when no voltage is applied to the EO crystal 41, the light beam is applied to the polygon mirror 2 rotationally driven by a polygon motor 3 without being deflected.

The light beam applied to the polygon mirror 2 is deflected and guided to the f-θ lens 14 with scanning it. The light beam having passed through the f-θ lens 14 forms an image on the photosensitive drum 15 with scanning on it in the main scanning direction at a constant speed. An electrostatic latent image is formed on the photosensitive drum 15 by this light beam scanning operation.

When a voltage is applied to the EO crystal 41 at a predetermined timing that falls outside the image forming time, the light beam to be applied to and deflected by the polygon mirror 2 is deflected in the sub-scanning direction by two to three degrees in the EO crystal 41. Then, the laser beam deflected in the sub-scanning direction is further deflected in the main scanning direction by the polygon mirror 2 and guided to the BD sensor 17 and light detection sensors 75a and 75b. The BD sensor 17 and light detection sensors 75a and 75b detect timings at which the light beam scanned in the main scanning direction by the polygon mirror 2 passes through them. When the image forming apparatus 100 processes images in a unit of a plurality of images, the electro-optical crystal member 12 deflects a light beam emitted by the laser diode 1, in the sub-scanning direction, within a period from the end of the formation of electrostatic latent images corresponding to the unit of images to the start of the formation of electrostatic latent images corresponding to the next unit of images. This makes it possible to correct an error in dot position in the main scanning direction, as needed, even when images are output continuously, thus forming electrostatic latent images with high positioning accuracy.

The BD sensor 17 is arranged above the reflecting member 18 near its end portion on the start side of the main scanning. The BD sensor 17 detects a light beam deflected in the sub-scanning direction by the electro-optical crystal member 12 and then deflected and scanned in the main scanning direction by the polygon mirror 2. More specifically, when the laser diode 1 is forcibly turned on at a time on which the scanning of a light beam to be applied on the photosensitive drum 15 starts, the BD sensor 17 detects a light beam deflected and scanned by the polygon mirror 2 within a period during which the laser diode 1 is forcibly kept ON. The BD sensor 17 outputs a beam detection signal (to be abbreviated as a BD signal hereinafter) serving as a reference signal of the write start timing in image formation for every main scanning to the dot position error detection unit 80 (to be described later).

The light detection sensor 75a is arranged above the reflecting member 18 at its substantially central portion. The light detection sensor 75b is arranged above the reflecting member 18 near its end portion on the scanning end side. The light detection sensors 75a and 75b detect a light beam deflected in the sub-scanning direction by the electro-optical crystal member 12 and deflected and scanned in the main scanning direction by the polygon mirror 2. More specifically, the light detection sensors 75a and 75b detect a light beam deflected and scanned by the polygon mirror 2 within a period during which the laser diode 1 is forcibly kept ON. The light detection sensor 75a outputs a signal (to be simply referred to as an "intermediate timing signal" hereinafter) corresponding to the intermediate write timing in image formation for every main scanning and the light detection sensor 75b outputs a signal (to be simply referred to as an "end timing signal" hereinafter) corresponding to the write end timing in image formation for every main scanning, respectively to the dot position error detection unit 80.

The amounts of error from the ideal image forming position are calculated based on the BD signal, intermediate timing signal and end timing signal respectively output from the BD sensor 17 and light detection sensors 75a and 75b by the dot position error detection unit 80, and input to the modulation/image data processing unit 81. The modulation/image data processing unit 81 corrects an error in dot position of image data in the main scanning direction. More specifically, based on the BD signal, intermediate timing signal and end timing signal, the amount of error in the distance from the initial dot position to the central dot position of image data from a theoretical ideal distance (to be referred to as the "first shift amount" hereinafter), and the amount of error in the distance from the central dot position to the final dot position of the image data from a theoretical ideal distance (to be referred to as the "second shift amount" hereinafter) are calculated and compared each other. The initial dot position and final dot position of the image data are then changed such that the difference between the first error amount and the second error amount becomes zero or a minimum. After that, the LD driving control unit 82 is controlled based on the corrected image data signal to change the light emission timing of the laser diode 1. With this operation, an error in dot position in the main scanning direction from a theoretical ideal dot position, within an image forming region corresponding to an electrostatic latent image formed on the photosensitive drum 15 is corrected.

<Arrangement Example of Scanning Control Unit>

Figure 3:
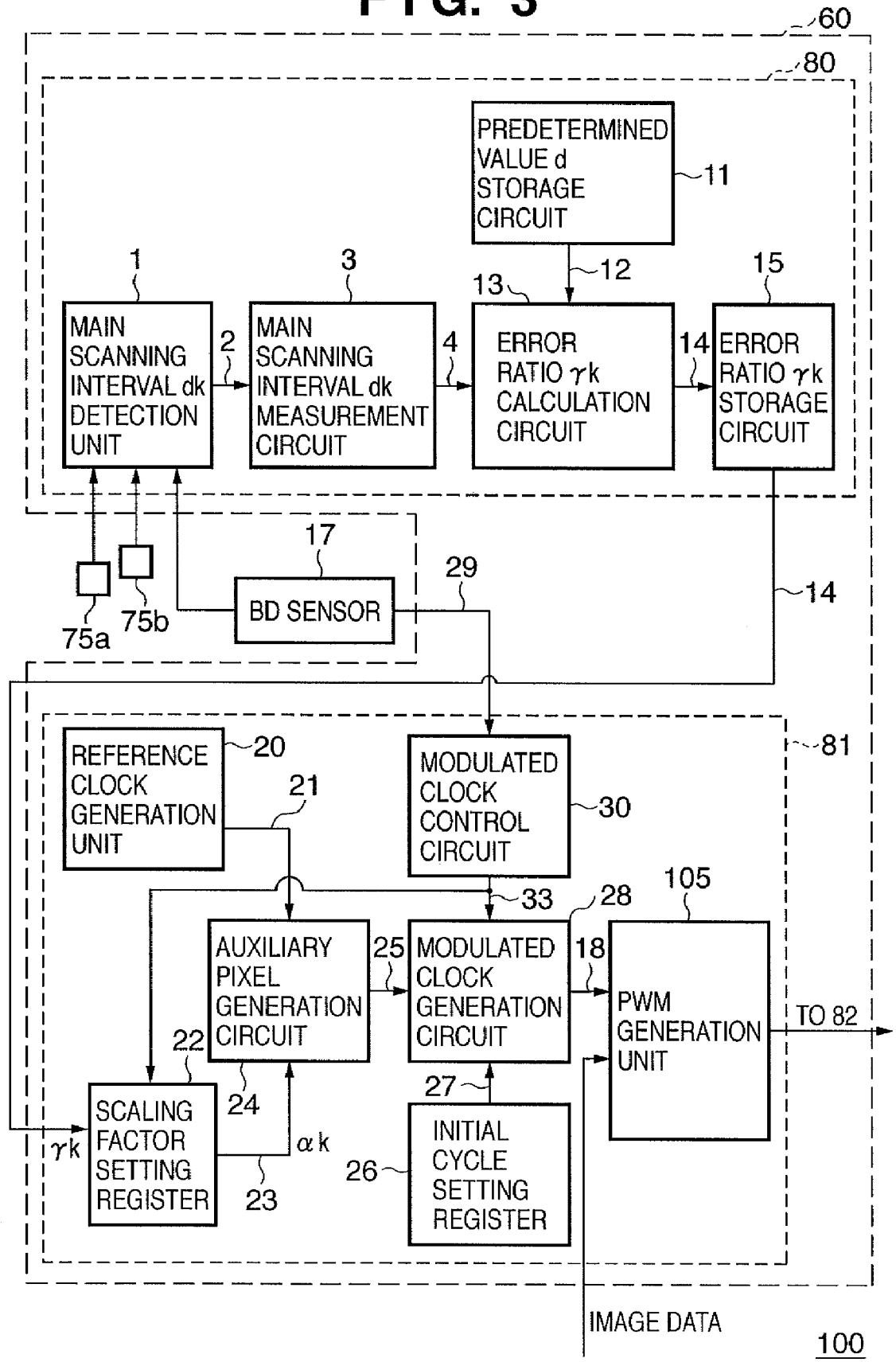
FIG. 3 is a block diagram showing the internal arrangement of a scanning control unit shown in FIG. 2.

FIG. 3 is a block diagram showing the internal arrangement of the scanning control unit 60 shown in FIG. 1A.

The scanning control unit 60 is a circuit which can correct an error in printing position on a main scanning line by modulating an image clock. As shown in FIG. 3, the scanning control unit 60 comprises the dot position error detection unit 80 and a modulation/image data processing unit 81.

(Arrangement Example of Dot Position Error Detection Unit 80)

The dot position error detection unit 80 comprises a main scanning interval "dk" detection circuit 1. Based on the BD signal, intermediate timing signal and end timing signal respectively output from the BD sensor 17 and light detection sensors 75a and 75b, the main scanning interval dk detection circuit 1 detects the distances between those sensors as the main scanning intervals, and outputs a main scanning interval signal 2 indicating the detected intervals. The main scanning interval signal 2 is input to a main scanning interval "dk" measurement circuit 3. The main scanning interval dk measurement circuit 3 converts the main scanning interval signal 2 into a main scanning interval measurement signal 4 serving as time data. The main scanning interval measurement signal 4 is supplied to an error ratio "γk" calculation circuit 13.

The error ratio γk calculation circuit 13 calculates the ratio between the value of the main scanning interval measurement signal 4 and a predetermined value 12 which is calculated based on the characteristics of the f-θ lens 14 in advance and preset in a predetermined value "d" storage circuit 11. The error ratio γk calculation circuit 13 outputs the resultant ratio as an error ratio signal 14. An error ratio "γk" storage circuit 15 stores the error ratio signal 14. The error ratio γk serves as a value associated with the amount of error.

The error ratio signal 14 stored in the error ratio γk storage circuit 15 is input to the modulation/image data processing unit 81. The modulation/image data processing unit 81 modulates the frequency of a preset image clock also with considering the value of the error ratio signal 14, and outputs the modulated frequency of clock as an image clock 18.

(Arrangement Example of Modulation/Image Data Processing Unit 81)

The arrangement of the modulation/image data processing unit 81 will be explained. As shown in FIG. 3, the modulation/image data processing unit 81 comprises a reference clock generation unit 20, a scaling factor setting register 22, an auxiliary pixel generation circuit 24, an initial cycle setting register 26, a modulated clock control circuit 30, and a modulated clock generation circuit 28.

The reference clock generation unit 20 generates a reference clock signal 21 with an arbitrary frequency. The scaling factor setting register 22 sets and holds a scaling factor 23 to change the cycle ratio of the reference clock signal 21 also with considering the error ratio γk output from the error ratio γk storage circuit 15 of the dot position error detection unit 80. In the scaling factor setting register 22, the scaling factor 23 is selected in accordance with a segment number described hereinafter as well as the error ratio signal 14. The scaling factor setting register 22 preferably comprises a table in which data is stored so that the scaling factor 23 is output in accordance with a segment number (hereinafter described in detail) and the error ratio signal 14.

The auxiliary pixel generation circuit 24 generates an auxiliary pixel cycle 25 based on the reference clock signal 21 and scaling factor 23. The auxiliary pixel cycle 25 corrects the magnification in the main scanning direction.

Because, the width or interval of dots in the main scanning direction formed on the photosensitive drum 15 becomes non-uniform due to factors associated with the optical systems of the polygon mirror 2 and f-θ lens 14 shown in FIGS. 1A and 1B. To avoid this problem, the auxiliary pixel cycle 25 is used to correct the frequency of clock in one main scanning interval to generate the image clock 18 such that the dot width or dot interval in the main scanning direction becomes uniform.

(Correction Example for Error by Rotation of Polygon Mirror)

When a rotary scanning system like the polygon mirror 2 is adopted, the two end portions of the photosensitive drum 15 in the main scanning direction are likely to be scanned at a relatively higher speed than the center portion. In contrast, the central portion of the photosensitive drum 15 in the main scanning direction is likely to be scanned at a relatively lower speed than the two end portions. For this reason, the frequency of the image clock 18 is corrected to be relatively fast near the two end portions of the photosensitive drum 15, while it is corrected to be relatively low at the central portion of the photosensitive drum 15. This makes it possible to uniform the width or interval of dots on the photosensitive drum 15.

For example, let "τref" be the cycle of the reference clock signal 21, "αk" be the scaling factor 23, and "Δτ" be the auxiliary pixel cycle 25. Then, Δτ is given by:

$$\Delta\tau = \alpha k \times \tau ref \quad (1)$$

The scaling factor 23 (αk) is selected in accordance with the following segment number k and the error ratio signal 14, and is set such that the auxiliary pixel cycle 25 (Δτ) becomes sufficiently shorter than the cycle of the image clock 18.

The initial cycle setting register 26 sets and holds an initial value 27 (τvdo) of the cycle of the image clock 18 output from the modulated clock generation circuit 28.

The modulated clock control circuit 30 divides one line scanned in the main scanning direction into segments including an arbitrary number of pixels to form a plurality of segments, and keeps the cycle of the image clock 18 in each segment constant.

(Operation Example of Modulated Clock Control Circuit 30)

Figure 4:
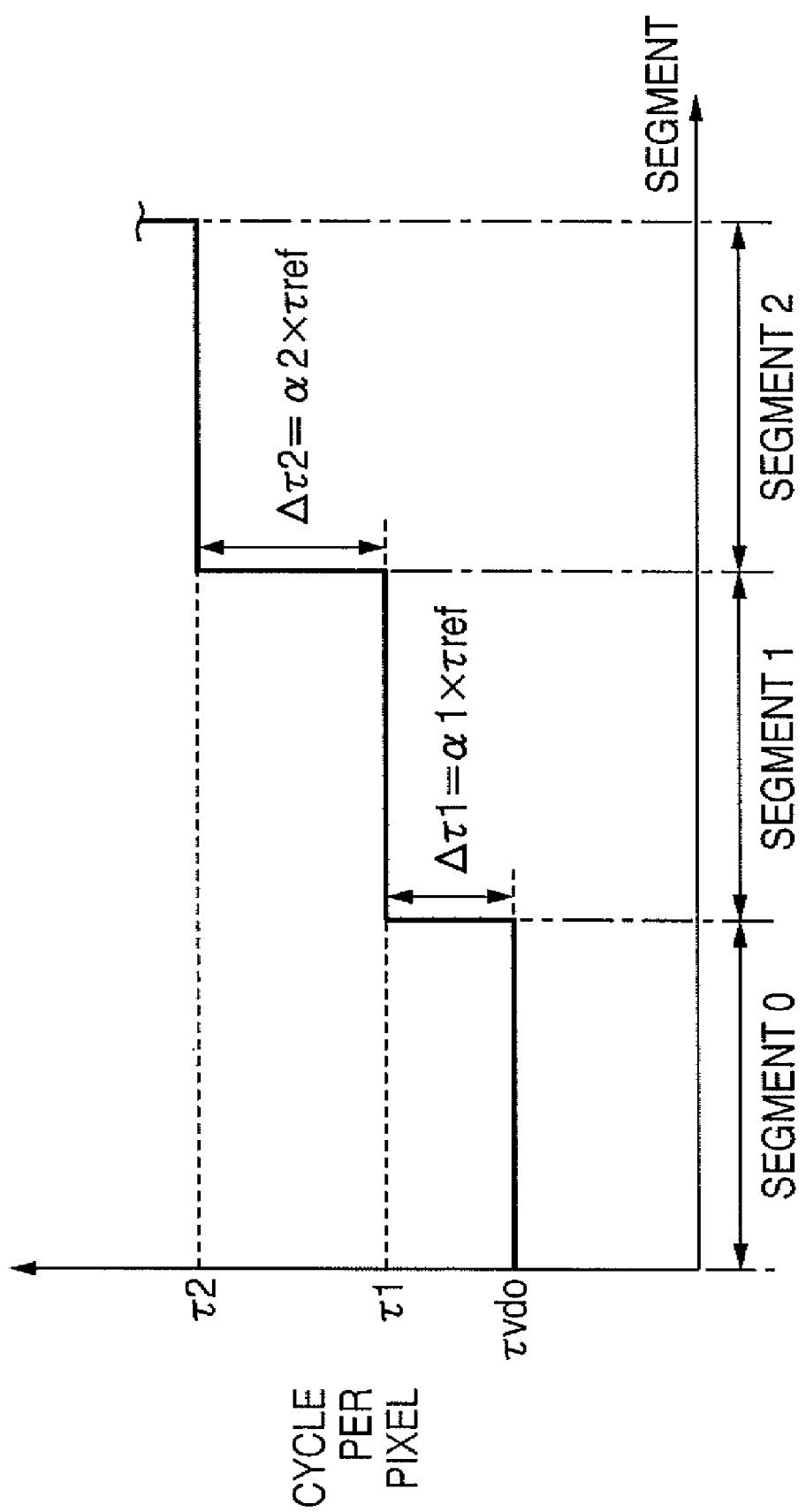
FIG. 4 is a chart showing the relationship between some segments formed by a modulated clock control circuit shown in FIG. 3 and the cycle of an image clock in each segment.

FIG. 4 is a chart showing the relationship between some segments formed by the modulated clock control circuit 30 shown in FIG. 3 and the cycle of an image clock 18 in each segment.

Referring to FIG. 4, the modulated clock control circuit 30 receives a BD signal 29 which is output from the BD sensor 17 and served as a reference for a start of image writing.

The modulated clock control circuit 30 generates a modulated clock control signal 33 for the initial segment (segment 0), and outputs it to the modulated clock generation circuit 28. Upon receiving the modulated clock control signal 33, the modulated clock generation circuit 28 outputs an image clock 18 with an initial cycle 27 (τvdo) held in the initial cycle setting register 26. For the next segment (segment 1), the modulated clock control circuit 30 generates a next modulated clock control signal 33, and outputs it to the modulated clock generation circuit 28. The modulated clock generation circuit 28 receives the next modulated clock control signal 33.

Based on an initial cycle 27 (τvdo) and an auxiliary pixel cycle 25 (=Δτ), the modulated clock generation circuit 28 generates a modulated clock τ1 with a cycle given by:

$$\tau 1 = \tau vdo + \Delta \tau \quad (2)$$
$$= \tau vdo + (\alpha 1 \times \tau ref)$$

where α1 is a scaling factor for segment 1 with considering the error ratio γk. The modulated clock generation circuit 28 outputs the modulated clock τ1 as an image clock 18.

Similarly, for the second next segment (segment 2), the modulated clock control circuit 30 further outputs a modulated clock control signal 33 to the modulated clock generation circuit 28.

The modulated clock generation circuit 28 receives this modulated clock signal control signal 33. Using an initial cycle 27 (τvdo) and an auxiliary pixel cycle 25, the modulated clock generation circuit 28 generates a modulated clock τ2 with a cycle given by:

$$\tau 2 = \tau vdo + (\alpha 1 \times \tau ref) + (\alpha 2 \times \tau ref) \quad (3)$$

where α2 is a scaling factor for segment 2 with considering the error ratio γk. The modulated clock generation circuit 28 outputs the modulated clock τ2 as an image clock 18.

For other segments subsequent to segment 2, the modulated clock generation circuit 28 generates modulated clocks "τn" and outputs them as image clocks 18.

As described above, the modulated clock control circuit 30 controls the modulated clock generation circuit 28 to output a plurality of image clocks 18 corresponding to the respective segments in one main scanning line.

(Example of Multi-Step Change in One Segment)

Figure 5B:
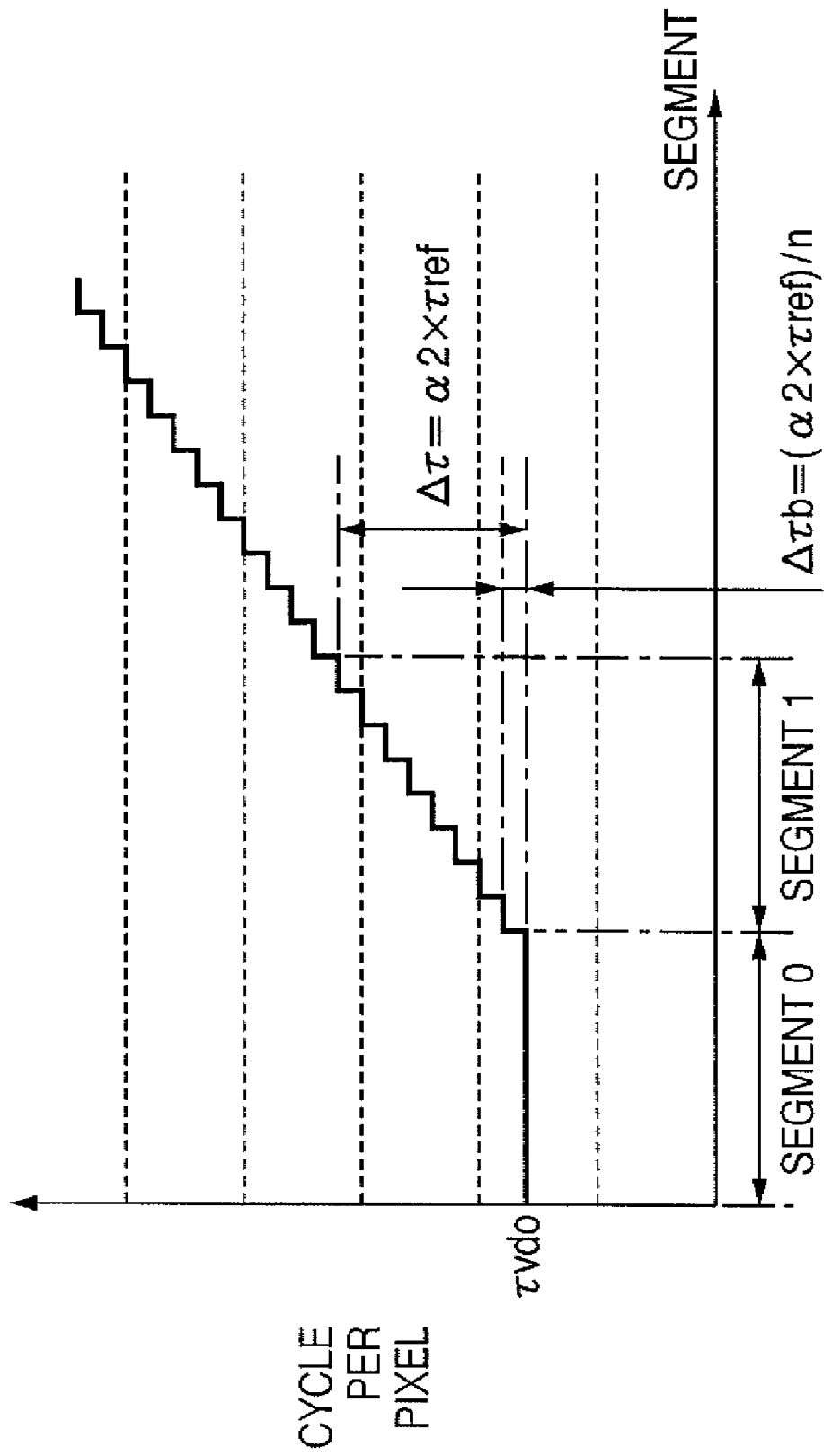
FIG. 5B is a chart showing the relationship between each segment and the cycle of an image clock in the segment when the initial segment is constant and an image clock in one segment is changed in a multi-step manner.

FIGS. 5A and 5B are charts each showing the relationship between each segment and the cycle of an image clock 18 in the segment when the image clock 18 in one segment is changed in a multi-step manner. FIG. 5A exemplifies a case in which the initial segment is variable. FIG. 5B exemplifies a case in which the initial segment is constant. A segment cycle control method when frequency modulation is performed in one segment will be explained below with reference to FIGS. 5A and 5B.

(1) Case in which Initial Segment (Segment 0) is Variable

Let "τvdo" be the initial cycle, "n" be the number of pixels per segment, "α1" be the modulation coefficient (segment 1), and "τref" be the reference clock cycle. Then, "Δτa" (the cycle per pixel in segment 0) and "ΔT0" (the overall cycle in segment 0) are given by:

$$\Delta \tau a = (\alpha 1 \times \tau ref)/n \quad (4)$$
and
$$\Delta T0 = \tau vdo + \{n \times (n+1)/2\} \times \{(\alpha 1 \times \tau ref)/n\} \quad (5)$$
$$= \tau vdo + (n+1)/2 \times (\alpha 1 \times \tau ref)$$

For other segments subsequent to segment 0, a cycle Δτa per pixel and an overall cycle Δtn (n≧1) in each segment can be defined by the same equations.

(2) Case in which Initial Segment (Segment 0) is Constant

Let "τvdo" be the initial cycle. Then, an overall cycle "ΔT0" in segment 0 is given by:

$$\Delta T0 = n \times \tau vdo \quad (6)$$

Let "α2" be the modulation coefficient (segment 2), and "τref" be the reference clock cycle. Then, "Δτb" (the cycle per pixel in segment 1) and "ΔT1" (the overall cycle in segment 1 are given by:

$$\Delta \tau b = (\alpha 2 \times \tau ref)/n \quad (7)$$
and
$$\Delta T1 = \tau vdo + \{n \times (n+1)/2\} \times \{(\alpha 2 \times \tau ref)/n\} \quad (8)$$
$$= \tau vdo + (n+1)/2 \times (\alpha 2 \times \tau ref)$$

For other segments subsequent to segment 1, a cycle Δτb per pixel and an overall cycle ΔTn (n≧2) in each segment can be defined by the same equations.

(Operation Example of PWM Generation Unit 105)

A PWM (Pulse Width Modulation) generation unit 105 receives image data 107 and the corrected and modulated image clock 18 from the modulated clock generation circuit 28.

The PWM generation unit 105 generates a pulse to control the ON/OFF time of the laser in one clock in accordance with the corrected and modulated image clock 18 and the image data 107, and outputs it to the laser driving control unit 82 to control the laser diode 1 as shown in FIG. 1A.

<Procedure Example of Magnification Control Processing in Main Scanning Direction of Optical Scanning Apparatus and Image Forming Apparatus>

Figure 6:
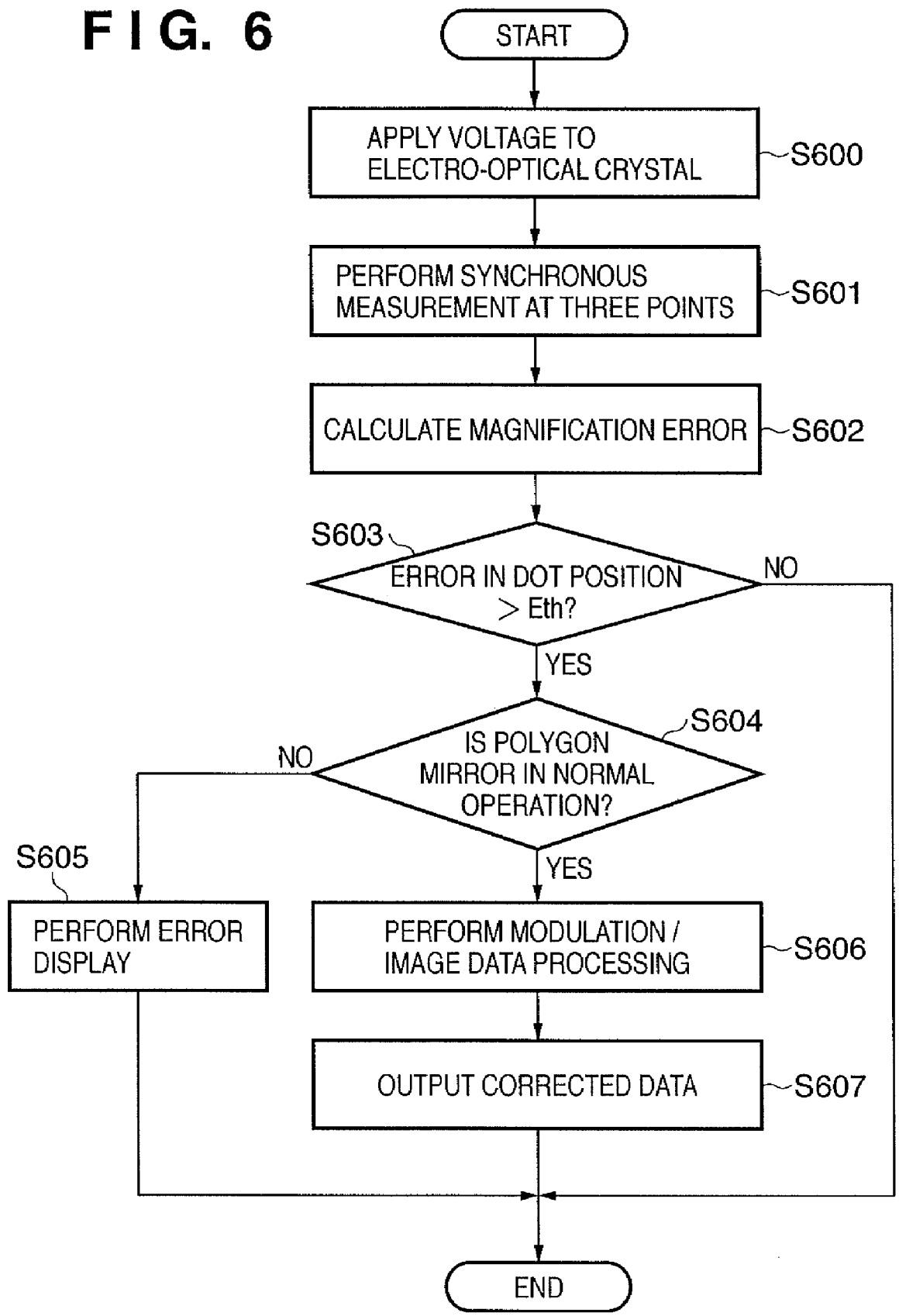
FIG. 6 is a flowchart illustrating main scanning magnification control processing executed by the optical scanning apparatus shown in FIGS. 1A and 1B.

FIG. 6 is a flowchart illustrating magnification control processing in the main scanning direction executed by the optical scanning apparatus 90 and the image forming apparatus 100 shown in FIG. 1A.

Referring to FIG. 6, upon receiving a request of starting the magnification control in the main scanning direction from an image forming controller (not shown) at a predetermined timing that falls outside the image forming time, the optical scanning apparatus 90 applies a voltage to the pair of electrodes 74a and 74b mounted on the EO crystal 41 (step S600). At almost the same time, the laser is turned on, and the polygon motor 3 is rotated. The laser beam is deflected in the sub-scanning direction by the EO crystal 41, also deflected for scanning of the laser beam by the polygon mirror 3 and guided toward the BD sensor 17 and light detection sensors 75a and 75b. With this operation, the scanning laser beam is synchronously measured at three points, and their count values corresponding to scanning intervals between the sensors are read based on timing signals transmitted from the BD sensor 17 and light detection sensors 75a and 75b (step S601).

After that, each count value read in step S601 is converted into a magnification error or an interval error in the main scanning direction from an ideal timing (step S602). This magnification error does not include a position error based on whether dot position is center or both ends of the image forming portion. It is determined whether the magnification error in the main scanning direction falls within the allowable range (indicated by Eth in FIG. 6) (step S603). If the magnification error in the main scanning direction falls within the allowable range (≦Eth), this processing ends without correcting the image clock 18 based on the error ratio γk and the image forming apparatus becomes ready for image formation.

If the magnification error in the main scanning direction falls outside the allowable range (>Eth), that is, an error in dot position occurs, whether or not the polygon mirror 2 is in normal operation is determined by, for example, detecting a polygon lock signal (step S604). If the polygon mirror 2 is in abnormal operation, an error message to prompt a serviceman call or the like is displayed on the operation unit (step S605). If the polygon mirror 2 is in normal operation, the modulation/image data processing unit 81 performs modulation/image data processing, that is, the correction of the image clock 18 based on the error ratio γk (step S606), and outputs a corrected image data signal to the LD driving control unit 82 (step S607) Then, the image forming apparatus becomes ready for image formation, and this processing ends.

Effect of First Embodiment

According to this embodiment, the electro-optical crystal member 12 is inserted in the optical path between the cylindrical lens 6 and the polygon mirror 2, and a laser beam emitted by the laser diode 1 is deflected in the sub-scanning direction by an applied voltage. The BD sensor 17 and light detection sensors 75a and 75b are respectively arranged at different position (for example, upper position) from the reflecting member 18 in the sub-scanning direction, and the central portion and two end portions within an image forming region corresponding to an electrostatic latent image formed on the photosensitive drum 15. The scanning control unit 60 controls the irradiation position of the laser beam on the photosensitive drum 15 in the main scanning direction based on the detection results obtained by the BD sensor 17 and light detection sensors 75a and 75b. Since the positional error of a laser beam can be detected without splitting the laser beam halfway, it is possible to perform accurate laser beam detection free from any influence of a loss of the amount of light. Additionally, since an error in dot position in the image forming region can be exactly corrected, it is therefore possible to exactly correct the image forming position while improving the detection accuracy.

Unlike the prior arts, it is possible to detect positional errors using all the components of a laser beam which is emitted by the light source, without splitting the light beam by, for example, a half mirror. This makes it possible to perform accurate laser beam detection even when a light source having a relatively small maximum output, such as a VCSEL, is used.

The KTN crystal is used as the electro-optical crystal member 12. The KTN crystal has the internal light transmittance of 95% or more per meter in the laser wavelength range of infrared light to visible light. In addition, the KTN crystal has a low birefringence. This makes it possible to perform high-precision laser beam detection.

Since all the components of a laser beam are deflected in the sub-scanning direction and guided to the BD sensor 17 and light detection sensors 75a and 75b for error detection, even a part of laser beam emitted for error detection never scans on the photosensitive drum 15, unlike a laser beam splitting method.

It is also possible to downsize the optical scanning apparatus and the image forming apparatus because the detection sensors can be arranged within a scope of the image forming region but there is no need to arrange the detection sensors at positions, which are largely distant from the image forming region forward and backward in the main scanning direction.

Although the light detection sensors 75a and 75b are arranged at the above-described positions in this embodiment, the present invention is not limited to this arrangement. The light detection sensors 75a and 75b may be arranged at positions other than the above-described positions as long as they fall within vicinities of the image forming region, in which a deflected and scanned laser beam can be detected. In addition, three or more light detection sensors may be arranged at equal intervals along the main scanning direction. To use more light detection sensors makes it possible to correct the main scanning magnification error with a higher accuracy.

Although three detection sensors (the BD sensor 17 and light detection sensors 75a and 75b) which detect a laser beam deflected in the sub-scanning direction are arranged in this embodiment, the present invention is not limited to this arrangement. At least two light detection sensors may be arranged at positions in an image forming region, at which a laser beam deflected in the sub-scanning direction and scanned in the main scanning direction can be detected. This makes it possible to exactly correct the image forming position while improving the detection accuracy.

<Second Arrangement Example of Optical Scanning Apparatus>

Figure 7:
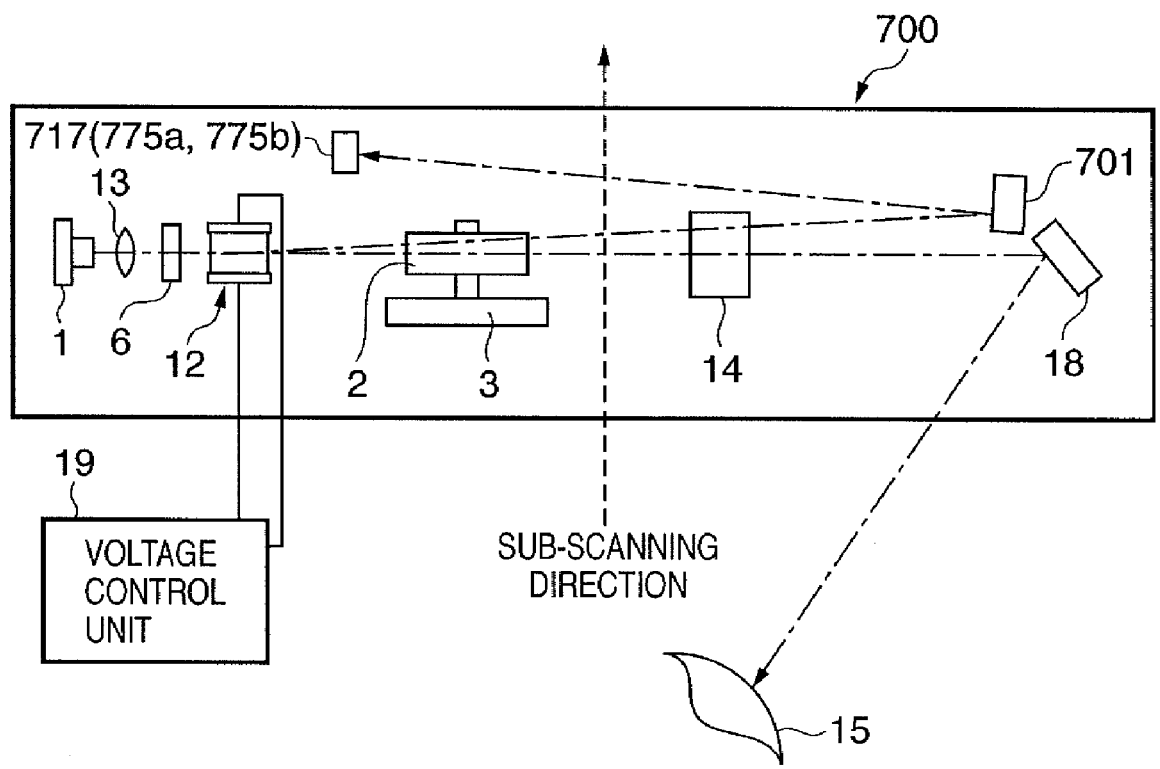
FIG. 7 is a plan view schematically showing the arrangement of an optical scanning apparatus according to the second embodiment of the present invention.

FIG. 7 is a plan view schematically showing the arrangement of an optical scanning apparatus according to the second embodiment of the present invention. The arrangement according to the second embodiment is the same as that according to the first embodiment. The same reference numerals as in the second embodiment denote the same constituent elements in the first embodiment, and a description thereof will not be repeated. Different parts will be explained below.

Referring to FIG. 7, an optical scanning apparatus 700 comprises a reflecting member for light detection 701, a BD sensor 717 and light detection sensors 775a and 775b. The reflecting member for light detection 701 reflects, in a predetermined direction, a laser beam deflected in the sub-scanning direction by an electro-optical crystal member 12. The BD sensor 717 and light detection sensors 775a and 775b detect the laser beam reflected by the reflecting member for light detection 701. The BD sensor 717 is arranged at a position at which the optical path length from the deflection point of the laser beam on a polygon mirror 2 to the light-receiving surface of the BD sensor 717 is nearly equal to that from the deflection point of the laser beam on the polygon mirror 2 to the surface of a photosensitive drum 15 at which an image forming starts in the main scanning direction. Each of the light detection sensors 775a and 775b is arranged at a position at which the optical path lengths from the deflection point of the laser beam on the polygon mirror 2 to the light-receiving surfaces of the light detection sensor 775a or 775b are nearly equal to those from the light deflection point of the laser beam on the polygon mirror 2 to the surfaces of the photosensitive drum 15 at which a center portion and an end portion of image are respectively formed. This makes it possible to detect an error in dot position on the surface of the photosensitive drum 15 with a higher accuracy, thus further improving the correction accuracy of image data.

<Third Arrangement Example of Optical Scanning Apparatus>

Figure 8:
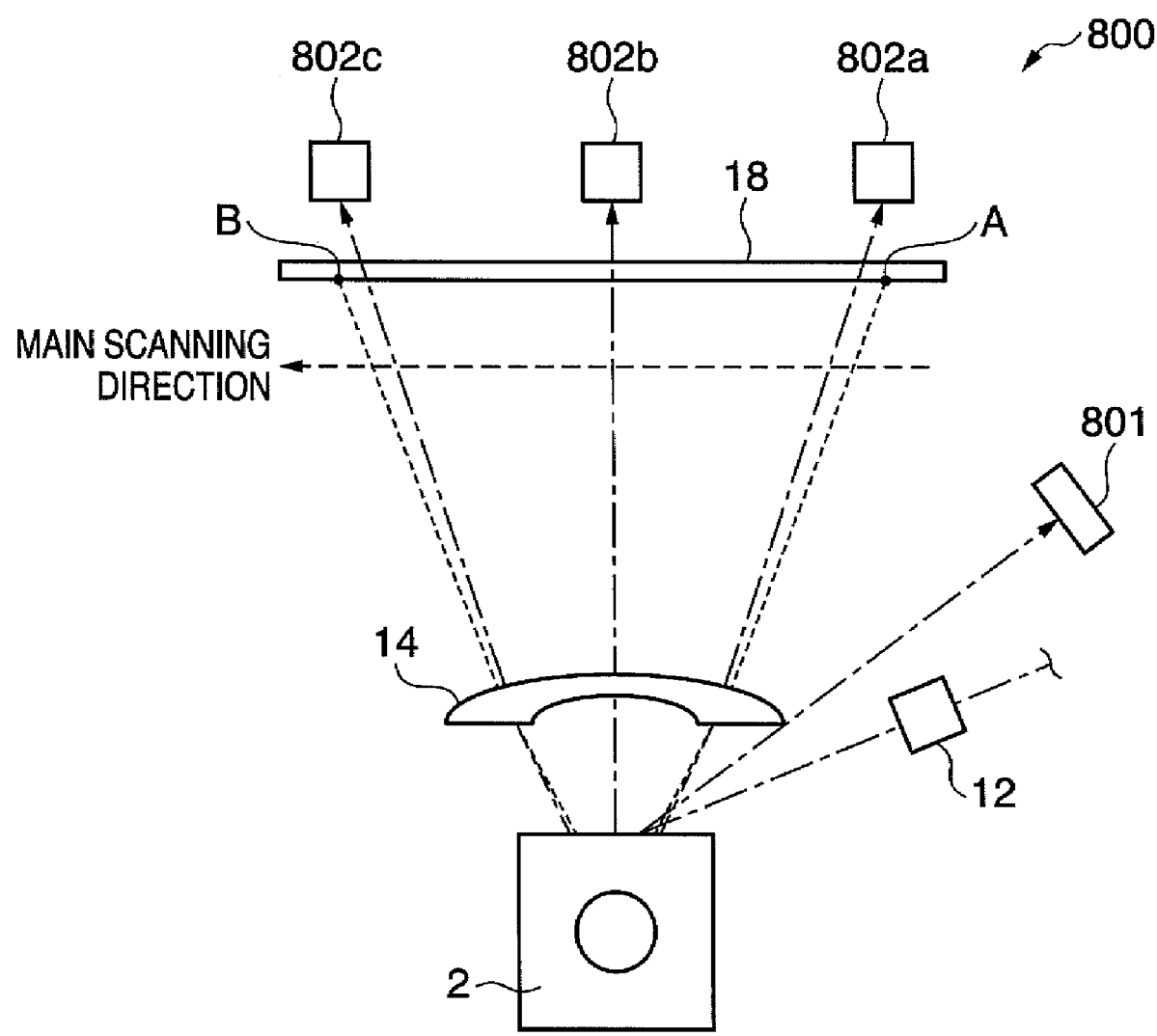
FIG. 8 is a plan view schematically showing the arrangement of an optical scanning apparatus according to the third embodiment of the present invention.

FIG. 8 is a plan view schematically showing the arrangement of an optical scanning apparatus according to the third embodiment of the present invention. The arrangement according to the third embodiment is the same as that according to the first embodiment. The same reference numerals as in the third embodiment denote the same constituent elements in the first embodiment, and a description thereof will not be repeated. Different parts will be explained below.

Referring to FIG. 8, an optical scanning apparatus 800 comprises a BD sensor 801 and light detection sensors 802a, 802b and 802c. The BD sensor 801 is arranged in almost the same plane as a polygon mirror 2 in the sub-scanning direction. The light detection sensors 802a, 802b and 802c are arranged above a reflecting member 18 at its substantially central portion and near both its end portions in the main scanning direction. More specifically, the light detection sensor 802a is arranged inside the initial irradiation position (shown as a position A in FIG. 8) of the reflecting member 18 by a laser beam scanned on a photosensitive drum 15. The light detection sensor 802c is arranged inside the final irradiation position (shown as a position B in FIG. 8) of the reflecting member 18 by the laser beam scanned on the photosensitive drum 15. This makes it possible to arrange all the light detection sensors inside the two ends of the reflecting member 18 in the main scanning direction, thus downsizing the optical scanning apparatus and the image forming apparatus.

<Still Another Arrangement Example of Optical Scanning Apparatus>

Figure 9:
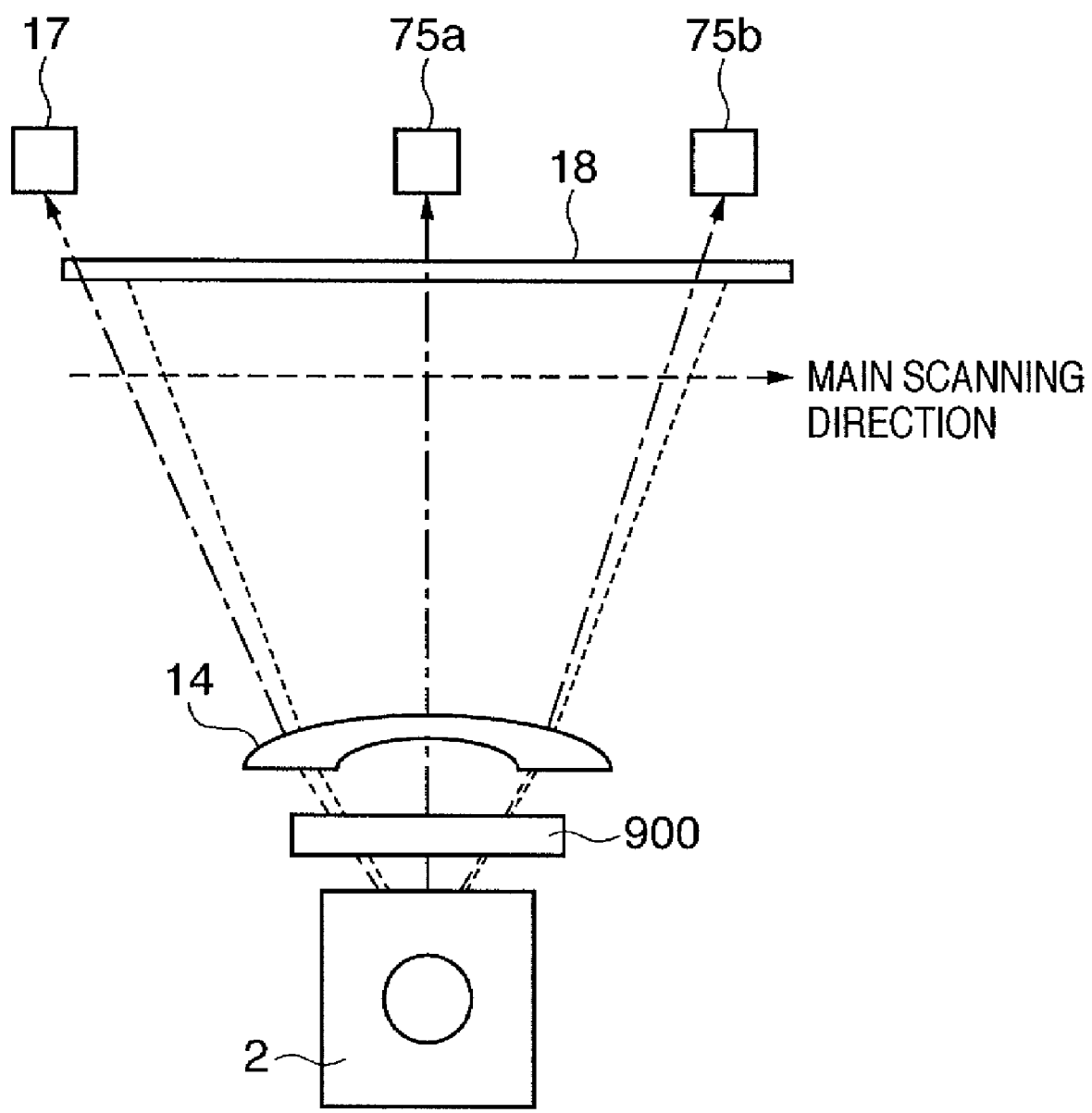
FIG. 9 is a view for explaining a modification of an electro-optical crystal member.

Although the electro-optical crystal member 12 is inserted into the optical path between the cylindrical lens 6 and the polygon mirror 2 in the above-described embodiments, the present invention is not limited to this arrangement. As shown in FIG. 9, an electro-optical crystal member 900 may be inserted into the optical path between a polygon mirror 2 and an f-θ lens 14. The electro-optical crystal member 900 has a long EO crystal extending in the main scanning direction, and deflects a laser beam scanned in the main scanning direction by the polygon mirror 2. This also makes it possible to arrange all the light detection sensors inside the two ends of the reflecting member 18 in the main scanning direction, thus downsizing the optical scanning apparatus and the image forming apparatus.

An electro-optical crystal structure may be inserted into any positions in the optical path between the laser diode 1 and the polygon mirror 2, the any positions on the incident side with respect to the polygon mirror 2, or the any positions on the exiting side with respect to the polygon mirror 2.

Although the polygon mirror 2 reflects the incident laser beam to cause it scanning on the photosensitive drum 15 in the above-described embodiments, the present invention is not limited to this application. The present invention is easily applied to any other systems in which by using a galvanometer mirror or an MEMS (Micro Electro Mechanical System) the light beam may scan on the photosensitive drum.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-355160, filed on Dec. 28, 2006, and Japanese Patent Application No. 2007-324019, filed on Dec. 14, 2007, which are hereby incorporated by reference herein in their entirety.

What is claimed is:

1. An optical scanning apparatus comprising:
    a light source adapted to emit a light beam;
    a light deflection unit adapted to deflect the light beam emitted from the light source in a main scanning direction;
    an electro-optical crystal member, which is provided in an optical path of the light source, adapted to deflect the light beam emitted from the light source in a sub-scanning direction by a voltage applied to the electro-optical crystal member; and
    a plurality of light detection units adapted to detect the light beam deflected in the sub-scanning direction by the electro-optical crystal member,
    wherein the electro-optical crystal member selectively deflects the light beam to at least one of a first optical path where a photosensitive member is provided or a second optical path where the plurality of light detection units are provided, the first and second optical paths being different in the sub-scanning direction,
    wherein the plurality of light detection units are arranged within an image forming region, in the main scanning direction, corresponding to an electrostatic latent image formed on the photosensitive member, and
    wherein outputs of the plurality of light detection units are used to control an irradiation position of the light beam on the photosensitive member in the main scanning direction.

2. The optical scanning apparatus according to claim 1, wherein the electro-optical crystal member is provided in an optical path between the light source and the light deflection unit.

3. The optical scanning apparatus according to claim 1, wherein the plurality of light detection units comprise three light detection units, which are respectively arranged at positions distant in the sub-scanning direction from an optical path of the light beam to the photosensitive member and at a central portion and two end portions in the main scanning direction within the image forming region.

4. The optical scanning apparatus according to claim 3, wherein the three light detection units detect timings at which the light beam deflected in the sub-scanning direction by the electro-optical crystal member and deflected and scanning in the main scanning direction by the light deflection unit respectively passes through the three light detection units.

5. The optical scanning apparatus according to claim 1, wherein the electro-optical crystal member is made of an electro-optical crystal having a characteristic in which a refractive index of the electro-optical crystal changes upon a voltage being applied,
    further comprising a voltage control unit adapted to control the voltage applied to the electro-optical crystal.

6. The optical scanning apparatus according to claim 5, wherein:
    the voltage control unit comprises a pair of electrodes mounted on surfaces of the electro-optical crystal, and
    a voltage applied to the pair of electrodes forms an electric field in the electro-optical crystal at a right angle with respect to a traveling path of the light beam passing through the electro-optical crystal.

7. The optical scanning apparatus according to claim 5, wherein the electro-optical crystal essentially consists of potassium, tantalum, niobium and oxygen.

8. The optical scanning apparatus according to claim 1, wherein when an image forming apparatus processes images in a unit of a plurality of images, the electro-optical crystal member deflects the light beam emitted from the light source, in the sub-scanning direction, within a period from an end of formation of an electrostatic latent image corresponding to the unit of images to a start of formation of an electrostatic latent image corresponding to the next unit of images.

9. The optical scanning apparatus according to claim 1, further comprising a light beam driving control unit adapted to control a driving of the light beam emitted from the light source in accordance with a pulse to control ON/OFF time of the light beam.

10. An image forming apparatus comprising an optical scanning apparatus, the optical scanning apparatus comprising:
- a light source adapted to emit a light beam;
- a light deflection unit adapted to deflect the light beam emitted from the light source in a main scanning direction;
- an electro-optical crystal member, which is provided in an optical path from the light source, adapted to deflect the light beam emitted from the light source in a sub-scanning direction by a voltage applied to the electro-optical crystal member; and
- a plurality of light detection units adapted to detect the light beam deflected in the sub-scanning direction by the electro-optical crystal member,
- wherein the electro-optical crystal member selectively deflects the light beam to at least one of a first optical path where a photosensitive member is provided or a second optical path where the plurality of light detection units are provided, the first and second optical paths being different in the sub-scanning direction,
- wherein the plurality of light detection units are arranged within an image forming region, in the main scanning direction, corresponding to an electrostatic latent image formed on the photosensitive member, and
- wherein outputs of the plurality of light detection units are used to control an irradiation position of the light beam on the photosensitive member in the main scanning direction.

11. The image forming apparatus according to claim 10, wherein the electro-optical crystal member is made of an electro-optical crystal having a characteristic in which a refractive index of the electro-optical crystal changes upon a voltage being applied,
further comprising a voltage control unit adapted to control the voltage applied to the electro-optical crystal.

12. The image forming apparatus according to claim 10, further comprising a photosensitive member on which an electrostatic latent image is formed at an irradiation position by the deflected light beam scanning on the photosensitive member.

13. The image forming apparatus according to claim 12, when the image forming apparatus processes images in a unit of a plurality of images, the image forming apparatus is controlled so that the electro-optical crystal member deflects the light beam emitted from the light source, in the sub-scanning direction, within a period from an end of formation of the electrostatic latent image corresponding to the unit of images to a start of formation of the electrostatic latent image corresponding to the next unit of images.

14. The image forming apparatus according to claim 10, further comprising:
- a scanning control unit adapted to control an irradiation position of the light beam on the photosensitive member in the main scanning direction by generating a pulse to control ON/OFF time of the light beam based on the detection results obtained by the plurality of light detection units; and
- a light beam driving control unit adapted to control a driving of the light beam emitted from the light source in accordance with the pulse to control ON/OFF time of the light beam.

* * * * *